United States Patent [19]
Cordes

[11] 3,763,026
[45] Oct. 2, 1973

[54] METHOD OF MAKING RESISTOR THIN FILMS BY REACTIVE SPUTTERING FROM A COMPOSITE SOURCE

[75] Inventor: Linus F. Cordes, Schenectady, N.Y.

[73] Assignee: General Electric Company, Schenectady, N.Y.

[22] Filed: Sept. 24, 1971

[21] Appl. No.: 183,688

Related U.S. Application Data

[62] Division of Ser. No. 887,440, Dec. 22, 1969, Pat. No. 3,703,456.

[52] U.S. Cl. .......... 204/192
[51] Int. Cl. .......... C23c 15/00
[58] Field of Search .......... 204/192

[56] References Cited

UNITED STATES PATENTS

| | | | |
|---|---|---|---|
| 3,481,854 | 12/1969 | Lane | 204/192 |
| 3,418,229 | 12/1968 | Lakshmanan et al. | 204/192 |
| 3,242,006 | 3/1966 | Gerstenberg | 204/192 |

*Primary Examiner*—John H. Mack
*Assistant Examiner*—D. R. Valentine
*Attorney*—Jerome C. Squillaro

[57] ABSTRACT

A method of making high resistivity thin film resistors by reactively sputtering a composite source onto a substrate is described. The composite source comprises a first material selected from the group consisting of chromium, silicon, beryllium, aluminum and magnesium and a second material selected from the group consisting of molybdenum, tantalum, tungsten, gold, silver, platinum, osmium and iridium. In the presence of a reactive gas such as nitrogen, the first materials form a high resistivity nitride on the substrate and the second materials either form a low resistivity nitride on the substrate or are non-reactive with the nitrogen and remain in their elemental states. The resulting thin films have resistivities ranging between the high resistivity nitrides and the low resistivity nitrides depending upon the composition of the composite source.

8 Claims, 2 Drawing Figures

Figure 1:
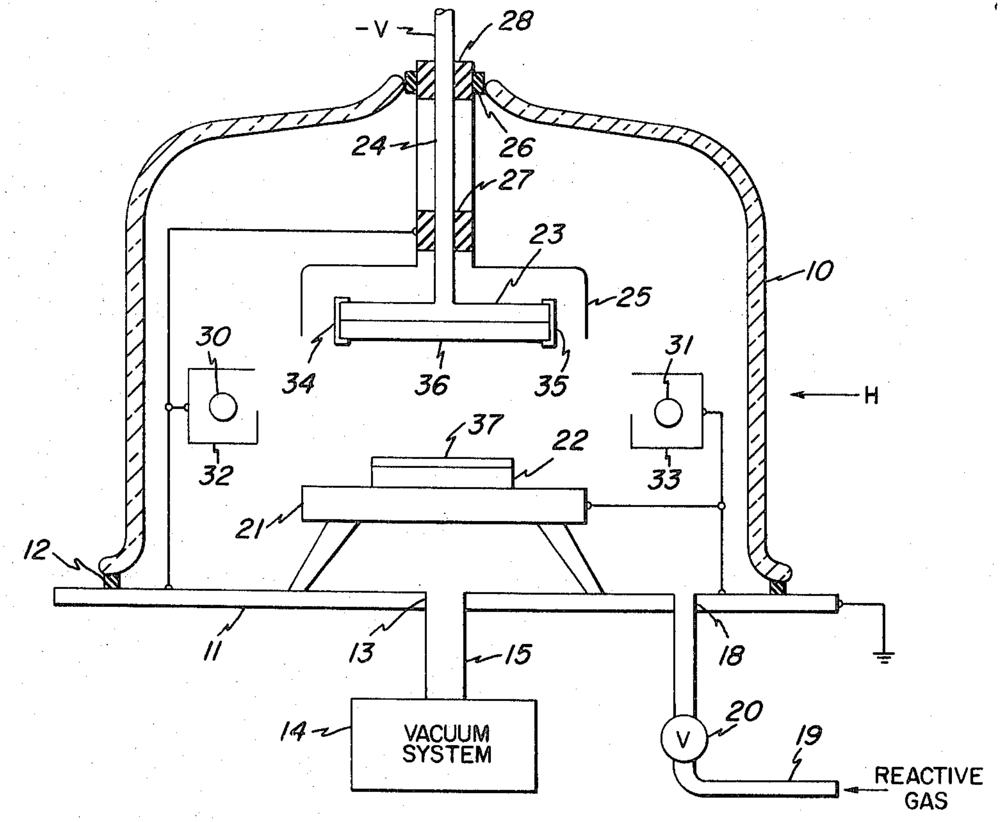

METHOD OF MAKING RESISTOR THIN FILMS BY REACTIVE SPUTTERING FROM A COMPOSITE SOURCE

This is a division, of application Ser. No. 887,440, filed Dec. 22, 1969, now U.S. Pat. No. 3,703,456.

This invention relates to a method of forming thin film resistors and in particular to the formation of high resistivity films by reactively sputtering from a composite source onto a substrate.

Thin film resistors suitable for integrated circuitry generally are characterized by a high resistivity, a low temperature coefficient of resistance and highly stable electrical properties upon aging. In addition to the foregoing characteristics, in commercial production of resistor films it is also desirable that there be a minimum number of process control variables so that films with particular characteristics can be reproduced with a high degree of confidence. Presently employed commercial methods of making resistor films of chromium and silicon monoxide, for example, by evaporation techniques produce desirable low temperature coefficient resistor films; however, this process is so strongly dependent upon temperature that slight variations produce completely different composition films or tend to produce non-uniform films. Therefore, sophisticated apparatus for accurately controlling the vaporization temperature of the materials is required. Even with such apparatus, it is still extremely difficult to reproduce uniform films of the desired resistivity characteristics with a high degree of confidence.

Another problem of prior art processes is the inability to produce high resistance films (i.e., greater than 10,000 ohms per square) with film thicknesses greater than approximately 100 A to 200 A. This thickness limitation results from a decrease in resistance with increased film thickness. Therefore, present day high resistance films in general tend to be less than 200 A thick. However, uniform continuous films of this general thickness not only are difficult to fabricate because the thickness of the film is approximately equal to the grain size of the deposited material but also tend to be unstable because of the discontinuous or agglomerated nature of the films. It is therefore an object of this invention to provide a novel method of forming high resistivity thin film resistors on a substrate in an easily controllable manner.

It is a further object of this invention to provide a method for forming resistor films with a high degree of confidence in the reproducibility of a particular resistivity film.

It is a further object of this invention to provide a novel method for forming thin film resistors having high resistivity, low temperature coefficient of resistance and good stability with age.

It is still a further object of this invention to provide an economical method of constructing continuous films of high resistivity suitable for microelectronic circuitry.

In accord with one embodiment of the invention these and other objects are achieved by reactively sputtering a composite source onto a substrate within a preselected reactive atmosphere to form the resultant thin film. The composite source may, for example, comprise a first material selected from the group consisting of chromium, silicon, beryllium, aluminum and magnesium and a second material selected from the group consisting of molybdenum, tantalum, tungsten, gold, silver, platinum, or other noble metals. The reactive gas is preferably either nitrogen or oxygen so that one of the materials from the first group forms a high resistivity nitride or oxide and the other group of materials either does not react with the gas or forms a low resistivity nitride or oxide. The resistivity of the resulting film is determined primarily by the composition of the composite source.

Figure 2:
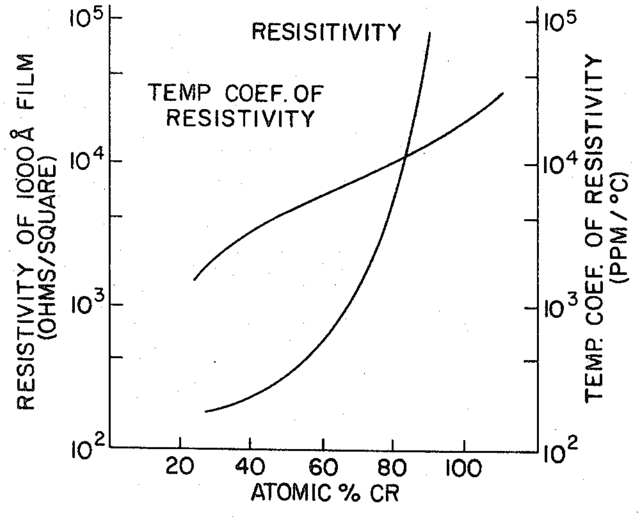

The novel features believed characteristic of the invention are set forth in the appended claims. The invention itself, together with further objects and advantages thereof, may best be understood by reference to the following description, taken in connection with the accompanying drawings, in which:

FIG. 1 is a schematic view of a sputtering apparatus suitable for forming resistor films in accord with the instant invention; and FIG. 2 is a graph depicting the variation of resistivity and temperature coefficient of resistivity with the percentage of chromium in a typical molybdenum-chromium composite source.

By way of example, FIG. 1 illustrates typical triode sputtering apparatus suitable for forming thin film resistors in accord with the instant invention and generally includes an evacuable chamber 10 of generally cylindrical shape with a circular base 11 with a suitable sealant, such as a gasket 12, provided between the bottom of the evacuable chamber 10 and the circular base 11 to insure isolation of the chamber from ambient conditions. Evacuation of the chamber is accomplished through an aperture 13 approximately centrally positioned within the base 11 and in communication with a vacuum system 14 by an exhaust line 15. The vacuum system may typically comprise an exhaust pump and a liquid nitrogen trap to prevent contamination of the chamber by feed-back through the exhaust lines during evacuation of the chamber 10.

A second aperture 18 within the base 11 permits the admission of a suitable reactive atmosphere, e.g., a gas such as nitrogen or oxygen, into the chamber 10 through a conduit 19 and a suitable valve 20, e.g., a motor driven variable leak valve, to continuously maintain the gaseous pressure within the chamber at a desired level (as will be described hereinafter), for the formation of high resistivity, low temperature coefficient resistance films. Although nitrogen and oxygen are preferred reactive gases because they are noncorrosive or do not form by-products, other gases such as, for example, nitrous oxide, nitric oxide, carbon monoxide, carbon dioxide and ammonia can also be used.

Within the evacuable chamber 10 is a support table 21 which rests on the base 11. A substrate 22 upon which the thin resistor film is to be deposited, is positioned on the support table 21. The substrate 22 may be any suitable non-conductive material, such as soda lime glass, quartz, mica, or aluminum oxide, or an insulating material overlying a conductive substrate, i.e., an oxide or nitride over silicon, for example. Positioned above the substrate 22 and in substantial alignment therewith is a cathode electrode 23 which may, for example, have a circular base portion with a supporting rod 24 extending centrally from the base portion through the top of the chamber 10 for connection to a power supply which may, for example, provide a selectively variable output voltage, −V, of from 0 to −5 kilovolts. The cathode 23 and supporting rod 24 are surrounded by an electrical shield 25 extending longitudinally along the length of the rod and terminating along a plane generally parallel to the surface of the cathode 23. The rod 24 and electrical shield 25 are supported from the top of the chamber 10 by an annular-shaped member 26 which provides both electrical insulation from the evacuable chamber 10 and acts as a sealant to maintain the vacuum in the chamber. The rod 24 is electrically insulated from the shield 25 by similar insulating members 27 and 28 spaced along the length of the rod 24. The electrical shield 25 and support table 21 are electrically grounded.

The triode sputtering system illustrated in FIG. 1 also employs an electron plasma generator comprising a pair of filaments 30 and 31 generally disposed on opposite ends of the support table 21 and intermediate the substrate 22 and cathode 23. The filaments 30 and 31 are enclosed within apertured shields 32 and 33, respectively, which are also electrically grounded. The filaments may be heated from a voltage source, such as a battery or an A.C. supply and also biased at a negative potential with respect to ground, such as −30 volts. Filaments 30 and 31 emit electrons in an omnidirectional manner; however, only those electrons passing through the apertures of each shield are permitted to pass in the region between the cathode 23 and substrate 22. The electrons are generally confined in a plane parallel to the surface of the cathode 23 and substrate 22 by a magnetic field H having a direction as indicated in FIG. 1 of the drawing.

Attached to the cathode 23 by clips 34 and 35, for example, is a composite source 36 which is the source of material for depositing a thin resistor film 37 on the substrate 22. The composite source 36 may, for example, comprise a powdered mixture of a first material selected from the group consisting of chromium, silicon, beryllium, aluminum and magnesium which form high resistivity nitrides or oxides as will be described hereinafter and a second material selected from the group consisting of molybdenum, tantalum and tungsten which form low resistivity nitrides or oxides as will be described hereinafter, and gold, silver, platinum, osmium and iridium which do not form nitrides or oxides very readily and which exhibit low resistivity characteristics in their elemental states. As used herein, the term "high resistivity nitride or oxide" is intended to define a nitride or oxide compound formed with a material selected from the group consisting of chromium, silicon, beryllium, aluminum and magnesium which exhibits a resistivity of greater than 10,000 ohms per square for films greater than approximately 100 A thickness. The term "low resistivity nitride or oxide" as used herein shall be intended to define a nitride or oxide compound formed with a material selected from the group consisting of molybdenum, tantalum and tungsten which exhibits a resistivity of less than 100 ohms per square for films greater than approximately 100 A thickness. By way of example, the composite structure may comprise molybdenum and chromium, silver and chromium, gold and aluminum, etc., in any desired proportion. Alternately, the source may comprise more than two materials, such as, for example, a composition of beryllium, molybdenum and gold, depending upon the requirements of the particular application. Accordingly, the claims are intended to cover all such modifications and variations.

A thin film resistor formed on an insulating substrate with a high resistivity forming nitride (or oxide) and a low resistivity-forming nitride (or oxide) therefore exhibits an intermediate resistivity within a range of resistivities limited on one end by the resistivity of the high resistivity nitride (or oxide) and on the other end by the resistivity of the low resistivity nitride (or oxide). For example, if a high resistivity-forming nitride source has a deposited resistivity of 50,000 ohms per square and a low resistivity-forming nitride source has a deposited resistivity of 10 ohms per square, respectively, for film thicknesses greater than 200 A, then a film comprising both high resistivity and low resistivity-forming nitrides has a resistivity intermediate these values and varies with the proportionate amount of each nitride.

The composite source may, for example, be formed by mixing 2 – 100 micron diameter powders of each of the selected materials until a homogeneous mixture is obtained, e.g., by rolling in a tube for 8 hours or more. Alcohol may be added to the mixture to form a slurry and further enhance the mixing action. The mixture is allowed to dry and is then placed in a die and compressed under a pressure of approximately 50,000 pounds per square inch, for example, to form a composite source structure which may, for example, take the form of a disc of approximately 1⅝ inches in diameter by ⅛-inch thickness. The 2 – 100 micron diameter powders are preferable because smaller diameter powders are difficult to compress and, even when compressed, tend to flake off the composite source. Powders of greater than 100 micron diameter, although easily compressed, tend to produce non-uniform sources and hence are undesirable.

In the operation of the method of the instant invention, a suitable non-conductive substrate 22, such as a soda lime glass substrate, after being suitably cleaned, is positioned on the support table 21. A suitable composite source 36 comprising a mixture selected from the foregoing groups is attached to the cathode 23 as described above and placed at a suitable distance, e.g., 2 to 4 centimeters from the substrate 22. While the spacing between cathode and substrate is not critical, spacings less than 2 centimeters generally produce non-uniform depositions and spacings greater than 4 centimeters tend to produce slow deposition rates and tend to be wasteful of the source by causing deposition on surrounding surfaces. Accordingly, based on these factors, a spacing of 2 to 4 centimeters is preferable.

The chamber is then evacuated to a relatively low pressure of approximately $1 \times 10^{-5}$ torr. After purging the chamber, a reactive gas, such as nitrogen, for example, is introduced into the chamber through the valve 20. A flowing nitrogen gas environment is maintained within the chamber, preferably at a pressure between $0.5 \times 10^{-3}$ torr and $10 \times 10^{-3}$ torr. With approximately −3 kilovolts applied between the cathode 23 and the support table 21, a magnetic field of approximately 150 Gauss and the filaments 30 and 31 energized, some of the electrons emitted from the filaments cause the reactive gas to ionize and produce positive ions. The positive ions and electrons form a plasma which is confined in a plane parallel to and intermediate the source and substrate by the magnetic field H. The positive ions in the plasma are attracted to the composite source by the large potential difference existing therebetween. The positive ions in effect bombard the composite source and liberate free atoms which leave the composite source and become deposited on the substrate 22. Some of the liberated atoms from the composite source react with the nitrogen before becoming deposited on the substrate and others react with the nitrogen on the surface of the substrate to form either high resistivity nitrides, in the case of chromium, silicon, beryllium, aluminum and magnesium or low resistivity nitrides in the case of tungsten, molybdenum and tantalum. As described above, gold, silver, platinum, osmium and iridium are non-reactive with nitrogen and oxygen under these conditions and atoms of these materials merely become deposited on the substrate. The resistivity of the resultant film is therefore a function of the composition of the deposited film which is primarily determined by the composition of the particular source.

For a given cathode to table voltage (i.e., bombarding energy), the rate at which atoms are liberated from the source and hence a measure of the rate of deposition of the sputtered film, depends primarily on the current density of the cathode. Only to a much lesser extent does gas pressure and substrate temperature affect the rate of deposition; however, these variables can be easily controlled, if desired. In practicing the process of the instant invention, current densities of less than 1 milliampere per square centimeter ($ma/cm^2$) to 100 $ma/cm^2$ can be used; however, a preferred range is 5 to 20 $ma/cm^2$ with resulting deposition rates of approximately 125 A per minute to 500 A per minute, respectively. At high current densities, cathode cooling may be required to prevent source evaporation and at low current densities, the rate of deposition is too slow to be commercially acceptable, therefore, operation within the above-mentioned range is preferable. Operation within this range is controlled by the voltage (and current) applied to the filaments 30 and 31, by techniques well known in the art.

It has been found that the resistivity of films produced in the foregoing manner is determined primarily by the composition of the composite source with the resistance of the resultant film determined only by the dimensions thereof. More specifically, for a film of a given composition and a thickness of greater than approximately 100 Angstroms, the resistance is solely determined by the length to width ratio of the film. Although relatively thick films (i.e., greater than 2000 A) exhibit substantially similar characteristics, the cost and time of fabrication limit the need for such films. However, the invention is intended to encompass all such films.

FIG. 2 illustrates typical resistivity characteristics of reactively sputtered (in nitrogen) thin films having a 1,000 A thickness as a function of atomic percentage of chromium in a molybdenum-chromium composite source. From the curve of FIG. 2, it can be seen that the resistance of a 1,000 A thick film deposited from a source comprising 10 atomic percent molybdenum and 90 atomic percent chromium is approximately 50,000 ohms per square and a film deposited from a source comprising 50 atomic percent molybdenum and 50 atomic percent chromium is 500 ohms per square.

FIG. 2 also illustrates the temperature coefficient of resistivity (TCR) for the same molybdenum-chromium films. For the 10 atomic percent molybdenum-90 atomic percent chromium source, the 50,000 ohms per square resistivity film has a TCR of approximately −17,500 PPM/°C, i.e., a resistance change of −875 ohms/°C. For the 50 atomic percent molybdenum-50 atomic percent chromium source, the TCR of the film is approximately −5,900 PPM/°C or −295 ohms/°C. In general, molybdenum-chromium thin films have a temperature dependence of resistivity over the range of 25°C to 200°C of the following form:

$$R = R_0 e^{-(E_A/kT)}$$

where $R$ is the resultant resistivity at a particular temperature, $R_0$ is the resistivity at 25°C, $E_A$ is an activation energy, $k$ is Boltzmann's constant and $T$ is the absolute temperature at which the resistivity $R$ is desired.

One of the particularly desirable characteristics of the instant invention is the ease with which different resistivity films can be produced. To change the desired resistivity, it is merely necessary to select a composite structure having the desired proportions of the particular source materials to meet the requirements of the particular application. For example, if a film having a resistivity of approximately 500 ohms per square is desired, then from the resistivity curve of FIG. 2, it can be seen that a 50 atomic percent molybdenum and 50 atomic percent chromium composite source produces the desired resistivity.

Since the resistivity of thin films made in accord with the instant invention is determined primarily by the composition of the composite source, all thin films deposited with a given source have substantially identical characteristics. Therefore, the resistance of the resulting film is determined only by the dimensions of the deposited film. This feature is particularly desirable in the fabrication of integrated circuits wherein it may be necessary to deposit one or more different resistivity films on a single substrate with a high degree of certainty that the deposited film will exhibit the desired characteristics.

Although the instant invention is being described with reference to a triode sputtering system, it should be understood that the invention can be practiced by other sputtering systems such as, for example, D.C. diode sputtering and R.F. diode sputtering. In instances where D.C. diode sputtering is employed, the reactive gas pressure is somewhat higher than when D.C. triode sputtering is employed, e.g., approximately 10 to 150 microns ($10^{-3}$ torr). On the other hand, when R.F. diode sputtering is employed, the reactive gas pressure is preferably 0.5 to 10 microns. The sputtering apparatus, illustrated in FIG. 1, is useful not only for D.C. triode sputtering but also for D.C. diode sputtering, the latter being achieved by merely not energizing the filaments and the magnetic field. Suitable apparatus for performing R.F. diode sputtering is disclosed in U.S. Pat. No. 3,287,243 to Ligenza.

It should be further understood that the invention is not limited to operation in a single gas environment, but may also be practised in a two-gas mixture wherein one gas is inert (i.e., does not react with the composite source) and the other is reactive. In this event, the resistivity of the resultant thin film is in part determined by the ratio of inert gas to reactive gas.

A more complete understanding of the principles of the instant invention can be obtained from the following specific examples of resistor film depositions employing various composite sources. The TCR for each thin film is in the range of 25° to 200°C. These examples are cited for further understanding of specific instances in which the instant invention may be practised and are not to be construed in a limiting sense.

EXAMPLE 1

A soda lime glass substrate is cleaned by boiling in water containing detergent, rinsing in cold, then hot deionized water, rinsing in isopropyl alcohol and drying in isopropyl alcohol vapors; the substrate is then placed on the support table in the evacuable chamber. A composite source 36 comprising 20 atomic percent molybdenum and 80 atomic percent chromium is positioned on the cathode 23 and approximately 3 cm. from the substrate 22. The chamber is then evacuated to a pressure of approximately $1 \times 10^{-5}$ torr and flowing nitrogen gas introduced into the chamber at a pressure of $3 \times 10^{-3}$ torr. The filaments 30 and 31 are energized to create a plasma between the composite source and the substrate in the presence of a magnetic field of 150 Gauss and a potential of approximately −3 kilovolts is applied to the cathode electrode. The filament voltage is adjusted to yield a cathode current density of about 10 ma/cm$^2$. Deposition is permitted to continue for approximately 5 minutes to produce a resistor film having a thickness of about 1,000 A. The deposited composition produces a resistor having a resistivity of approximately 6,000 ohms per square and a TCR of about −12,000 PPM/°C.

EXAMPLE 2

A composite source having 40 atomic percent silver and 60 atomic percent chromium is sputtered onto a substrate under the same conditions as Example 1 with the resultant thin film having a resistivity of 3,000 ohms per square and a TCR of −700 PPM/°C.

EXAMPLE 3

A composite source having 70 atomic percent gold and 30 atomic percent chromium is sputtered onto a substrate under the same conditions as Example 1 but for only two minutes with the resultant thin film having a thickness of approximately 400 A and a resistivity of 50 ohms per square and a TCR of less than 50 PPM/°C.

EXAMPLE 4

A silicon nitride covered semiconductive silicon wafer is placed on the support table in the evacuable chamber at a distance of approximately 2 cm. from a composite source comprising 70 atomic percent silver and 30 atomic percent chromium. The chamber is then evacuated to a pressure of approximately $1 \times 10^{-5}$ torr and oxygen admitted into the chamber and the pressure maintained at approximately $20 \times 10^{-3}$ torr. With a cathode voltage of approximately −3 kilovolts, a cathode current density of approximately 10 ma/cm$^2$ results and after approximately 4 minutes of deposition a resistor film having a thickness of about 1,000 A is produced. The deposited composition produces a resistor having 60 ohms per square resistivity and a TCR of less than 50 PPM/°C.

EXAMPLE 5

A composite source having 40 atomic percent silver and 60 atomic percent chromium is sputtered onto a substrate under the same conditions as Example 4 but for only 1 minute with the resultant film having a thickness of 250 A and a resistivity of approximately 30,000 ohms per square and a TCR of about −700 PPM/°C.

In summary, in accord with the instant invention, there are described methods for making thin films having resistivities from less than 20 ohms per square to greater than 50,000 ohms per square with thickness of greater than 100 A and with the capability of producing excellent TCR characteristics. The resistivity of the films made in accord with the instant invention can be reproduced very accurately because the primary determinant of the resistivity is the composition of the composite source which can be controlled very accurately.

While the invention has been described with respect to certain specific embodiments, it will be appreciated that many modifications and changes may be made without departing from the spirit of the instant invention. Therefore, the appended claims are intended to cover all such modifications and changes as fall within the true spirit and scope of the invention.

What is claimed as new and desired to be secured by Letters Patent of the United States is:

1. A method of forming high resistance thin film resistors comprising the steps of:

positioning a substrate and a source within an evacuable chamber, said source comprising a composite structure of a first material selected from the group consisting of chromium, silicon, beryllium, aluminum and magnesium, and a second material selected from the group consisting of silver, gold, platinum, osmium and iridium;

evacuating said chamber and introducing a reactive gas selected from the group consisting of nitrogen, nitrous oxide, nitric oxide and ammonia; and reactively sputtering said source onto said substrate to form a thin film resistor upon said substrate.

2. The method of claim 1 wherein said reactive gas is nitrogen and said first material forms a high resistivity nitride and said second material is nonreactive with said nitrogen.

3. The method of claim 1 wherein said reactive gas is maintained at a pressure of from $0.5 \times 10^{-3}$ torr to $150 \times 10^{-3}$ torr.

4. The method of claim 1 wherein said source and said substrate are in substantially parallel relationship and separated from each other by at least 2 centimeters.

5. The method of claim 1 wherein the step of reactively sputtering comprises:

bombarding said source with positive ions to liberate free atoms therefrom, at least some of said atoms reacting with said gas to form a resistance film on said substrate, said film characterized by a high resistivity per square and a low temperature coefficient of resistivity.

6. The method of claim 1 wherein said source is formed by mixing powders selected from said groups of said first and second materials and compressing said powders to form said composite structure.

7. The method of claim 1 wherein said substrate comprises a semiconductor body having an insulating layer over a major surface thereof on which said film is deposited.

8. The method of claim 1 wherein said thin film is greater than approximately 100 A thick.

* * * * *